United States Patent [19]

Matsuda et al.

[11] Patent Number: 5,181,174
[45] Date of Patent: Jan. 19, 1993

[54] TRACTION CONTROL METHOD FOR VEHICLE

[75] Inventors: Shohei Matsuda; Toshio Yahagi, both of Saitama, Japan

[73] Assignee: Honda Giken Kogyo Kabushiki Kaisha, Tokyo, Japan

[21] Appl. No.: 592,733

[22] Filed: Oct. 4, 1990

[30] Foreign Application Priority Data

Oct. 5, 1989 [JP] Japan .................. 1-260861

[51] Int. Cl.⁵ .............................. B60T 8/58
[52] U.S. Cl. ........................ 364/426.02; 180/197; 303/103
[58] Field of Search ............... 364/426.02, 426.03, 364/565, 566; 180/197; 303/97, 103, 105

[56] References Cited

U.S. PATENT DOCUMENTS

| | | | |
|---|---|---|---|
| 4,718,013 | 1/1988 | Kubo | 364/565 |
| 4,787,682 | 11/1988 | Muto | 303/103 |
| 4,969,100 | 11/1990 | Takata et al. | 364/565 |
| 4,970,649 | 11/1990 | Matsuda | 364/426.02 |
| 4,974,163 | 11/1990 | Yasuno et al. | 364/426.02 |
| 4,982,348 | 1/1991 | Matsuda et al. | 364/565 |
| 4,991,910 | 2/1991 | Shimanuki et al. | 364/426.02 |
| 5,003,481 | 3/1991 | Matsuda | 364/426.02 |
| 5,058,019 | 10/1991 | Litkouhi | 364/426.02 |

FOREIGN PATENT DOCUMENTS 2151320 7/1985 United Kingdom .

Primary Examiner—Gary Chin
Attorney, Agent, or Firm—Armstrong, Westerman, Hattori, McLeland & Naughton

[57] ABSTRACT

A traction control method for a vehicle, includes the steps of comparing the amount of driven wheel speed ($V_W$) changed per unit time with a reference deceleration ($\Delta V_{R-}$) determined in correspondence to the lowest deceleration on a road surface of a lowest frictional coefficient which can be usually supposed, setting the vehicle speed ($V_R$) equal to the driven wheel speed ($V_W$), if the amount of driven wheel speed ($V_W$) changed per unit time indicates a deceleration less than a reference deceleration ($V_{R-}$); setting the vehicle speed ($V_R$) equal to the last determined vehicle speed ($V_{R(n-1)}$) corrected by the reference deceleration, if the amount of driven wheel speed ($V_W$) changed per unit time indicates a deceleration greater than or equal to the reference deceleration ($\Delta V_{R-}$); determining a slipping tendency of a driving wheel in a driving state at least in part by comparing a reference speed ($V_{RH}$, $V_{RL}$) obtained on the basis of a vehicle speed ($V_R$) with a driving wheel speed; and suppressing the driving torque in accordance with a determined slipping tendency of a driving wheel in the driving state. Further, the amount of driven wheel speed ($V_W$) changed per unit time may also be compared to a reference acceleration ($\Delta V_{R+}$).

2 Claims, 4 Drawing Sheets

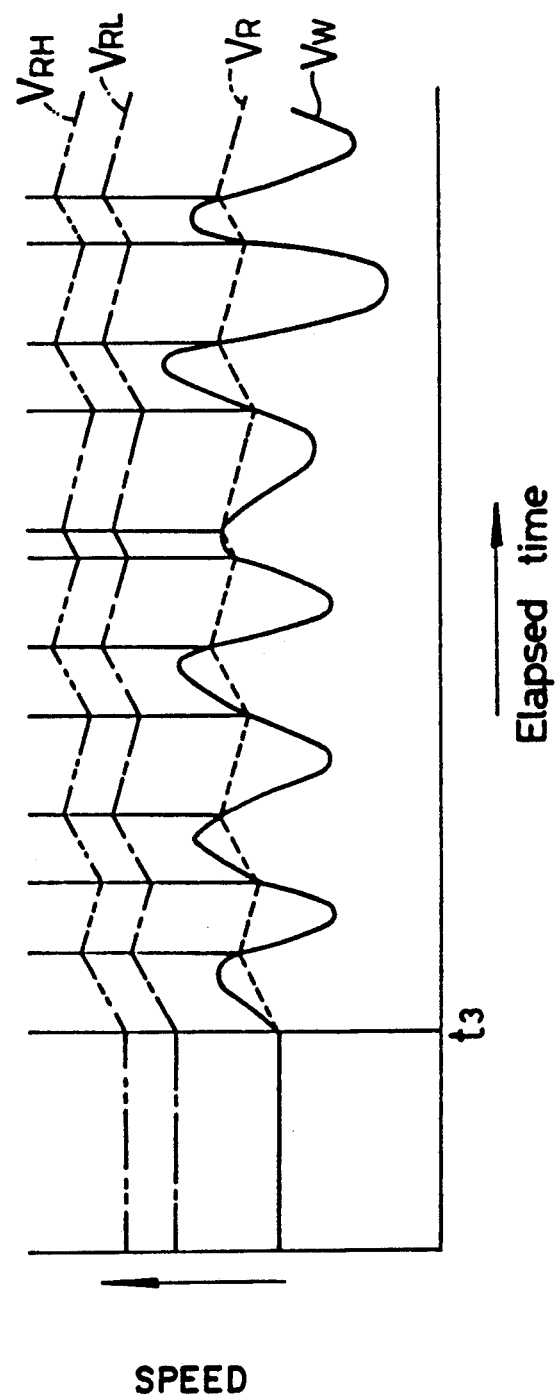

TRACTION CONTROL METHOD FOR VEHICLE

BACKGROUND OF THE INVENTION

The present invention relates to a traction control method for a vehicle, in which controlling the driving torque in a suppressing manner in accordance with the slipping tendency of a driving wheel in a driving state, a value determined by comparison of a reference speed ($V_{RH}$, $V_{RL}$) obtained on the basis of a vehicle speed ($V_R$) with a driving wheel speed is used as at least one condition for deciding the slipping tendency of the driving wheel in the driving state.

Such traction control methods are conventionally known, for example, from Japanese Patent Application Laid-open No. 265061/87.

In the above conventional method, the vehicle speed is presumed from the driven wheel speed, and the slipping tendency of the driving wheel is decided by comparison of a reference speed obtained on the basis of the presumed vehicle speed with a driving wheel speed. In such a conventional manner, however, the speeds of the driving and driven wheels may vary significantly when the vehicle is travelling on a bad road, and it is feared that in spite of the fact that the driving wheel is not in the slipping state, the traction control may be executed based upon the mistaken decision that the driving wheel has been in an excessively slipping state.

SUMMARY OF THE INVENTION

The present invention overcomes the above disadvantages of the conventionally known method, and it is an object of the present invention to provide a traction control method for a vehicle, wherein when the wheel speed varies significantly, the traction control is prevented from being accidentally executed.

According to a first aspect of the present invention, the amount of driven wheel speed changed per unit time is compared with a reference deceleration determined in correspondence to the lowest deceleration on a road surface of the lowest frictional coefficient which can be usually supposed, and if the amount of driven wheel speed changed per unit time indicates a deceleration smaller than the reference deceleration, the driven wheel speed is determined as the vehicle speed, and if the amount of driven wheel speed changed per unit time indicates a deceleration greater than or equal to the reference deceleration, the last determined vehicle speed corrected by a value based on the reference deceleration is determined as the vehicle speed.

In addition, according to a second aspect of the present invention, the amount of driven wheel speed changed per unit time is compared with a reference deceleration as well as a reference acceleration whose absolute value is set larger than that of the reference deceleration, and if the amount of driven wheel speed changed per unit time indicates a deceleration smaller than the reference deceleration, the driven wheel speed is determined as the vehicle speed; if the amount of driven wheel speed changed per unit item indicates a deceleration greater than or equal to the reference deceleration, the last determined vehicle corrected by a value based on the reference deceleration is determined as the vehicle speed; if the amount of driven wheel speed changed per unit time indicates an acceleration less than the reference acceleration, the driven wheel speed is determined as the vehicle speed; and if the amount of driven wheel speed changed per unit time indicates an acceleration greater than or equal to the reference acceleration, speed corrected by a value based on the reference acceleration is determined as the vehicle speed.

According to the above first aspect, a deceleration of the vehicle can be obtained from the amount of driven wheel speed changed per unit time. When such deceleration is less than the reference deceleration, the driven wheel speed is determined as the vehicle speed, and when such deceleration has become greater than or equal to the reference deceleration, last determined vehicle wheel speed corrected by a value based on the reference deceleration is determined as the vehicle speed. This insured that when the driven wheel speed varies significantly, the vehicle speed is gradually increased and in accordance with this increase, the reference speed is increased. Therefore, the control sensitivity for the traction control is reduced, thereby avoiding the accidental execution of the traction control when the vehicle is travelling along a bad road.

As discussed above, according to the first aspect of the present invention, the amount of driven wheel speed changed per unit time is compared with the reference deceleration determined in correspondence to the lowest deceleration on the road surface of the lowest frictional coefficient which can be usually supposed. When the amount of driven wheel speed changed per unit time indicates a deceleration smaller than the reference deceleration, the driven wheel speed is determined as the vehicle speed, and when the amount of driven wheel speed changed per unit time indicates a deceleration greater than or equal to the reference deceleration, the last determined vehicle speed corrected by a value based on the reference deceleration is determined as the vehicle speed. Therefore, when the vehicle is travelling on a bad road where the wheel speed varies substantially, the control sensitivity is reduced to avoid the accidental execution of the traction control.

According to the above second aspect, an acceleration or deceleration of the vehicle can be obtained from the amount of driven wheel speed changed per unit time. When such acceleration or deceleration is between the reference deceleration and the reference acceleration, the driven wheel speed is determined as the vehicle speed, and when such acceleration or deceleration indicates a deceleration greater than or equal to the reference deceleration, the last determined vehicle speed corrected by a value based on the reference deceleration is determined as the vehicle speed and further, when such acceleration or deceleration indicates an acceleration equal to or more than the reference acceleration, the last determined vehicle speed corrected by a value based on the reference acceleration is determined as the vehicle speed. This ensures that when the driven wheel speed varies significantly, the vehicle speed is increased. Therefore, the control sensitivity for the traction control is reduced, thereby avoiding the accidental execution of the traction control when the vehicle is travelling along a bad road.

In addition, according to the second aspect of the present invention, the amount of driven wheel speed changed per unit time is compared with a reference deceleration as well as a reference acceleration determined with its absolute value larger than the reference deceleration. When the amount of driven wheel speed changed per unit time indicates a deceleration smaller than the reference deceleration, the driven wheel speed is determined as the vehicle speed, and when the amount of driven wheel speed changed per unit time indicates a deceleration greater than or equal to the reference deceleration, the last determined vehicle speed corrected by a value based on the reference deceleration is determined as the vehicle speed. When the amount of driven wheel speed changed per unit time indicates an acceleration less than the reference acceleration, the driven wheel speed is determined as the vehicle speed, and when the amount of driven wheel speed changed per unit time indicates an acceleration greater than or equal to the reference acceleration, the last determined vehicle speed corrected by a value based on the reference acceleration is determined as the vehicle speed. Therefore, when the vehicle is travelling on the bad road where the wheel speed varies substantially, the control sensitivity is reduced to avoid the accidental execution of the traction control.

BRIEF DESCRIPTION OF THE DRAWINGS

FIG. 5 is a graph illustrating the vehicle speed and each reference speed with the lapse of time.

DETAILED DESCRIPTION OF THE PREFERRED EMBODIMENTS

Figure 1:
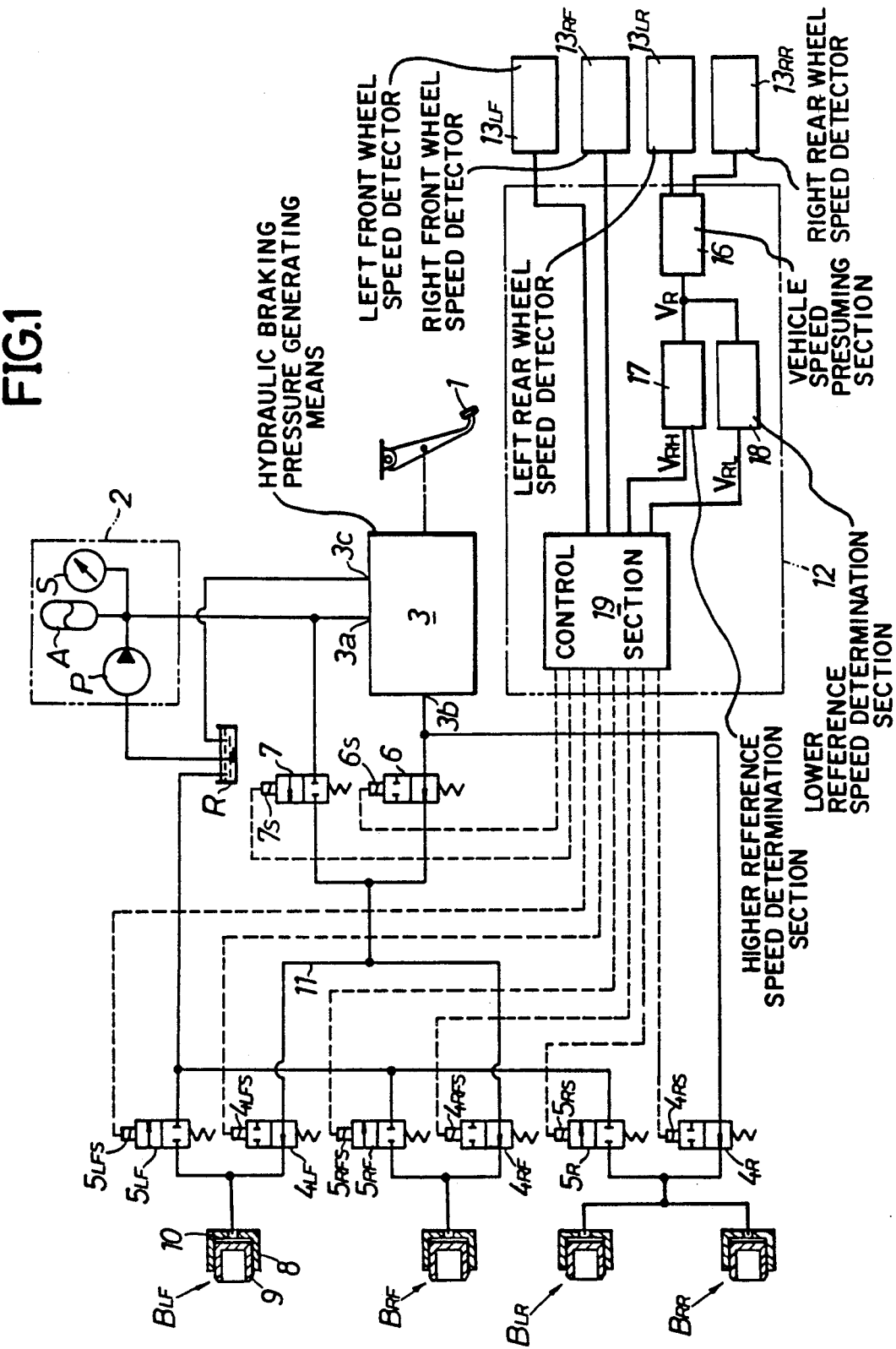
FIG. 1 is a schematic diagram of a traction control system in accordance with the instant invention.

The present invention will now be described with reference to the accompanying drawings in connection with an embodiment in which the present invention is applied to a front engine and front drive vehicle. Referring first to FIG. 1, a left driving wheel brake device $B_{LF}$ and a right driving wheel brake device $B_{RF}$ are mounted on left and right front wheels of the vehicle, respectively, and a left driven wheel brake device $B_{LR}$ and a right driven wheel brake device $B_{RR}$ are mounted on left and right rear wheels, respectively. A hydraulic braking pressure generating means 3 is connected to a brake pedal 1 and capable of controlling the hydraulic pressure from a hydraulic pressure supply source 2 in accordance with the amount brake pedal 1 is depressed in order to produce a controlled hydraulic pressure. During normal braking, the hydraulic pressure produced by the hydraulic braking pressure generating means 3 is applied to each of the brake devices $B_{LF}$, $B_{RF}$, $B_{LR}$ and $B_{RR}$. The hydraulic braking pressure of the brake devices $B_{LF}$, $B_{RF}$, $B_{LR}$ and $B_{RR}$ can be maintained or reduced to effect an anti-lock control through inlet solenoid valves $4_{LF}$ and $4_{RF}$ and outlet solenoid valves $5_{LF}$ and $5_{RF}$ mounted in independent association with the driving wheel brake devices $B_{LF}$ and $B_{RF}$ and an inlet solenoid valve $4_R$ and an outlet solenoid valve $5_R$ which are commonly associated with the driven wheel brake devices $B_{LR}$ and $B_{RR}$. In addition, the hydraulic braking pressure of the driving wheel brake devices $B_{LF}$ and $B_{RF}$ can be increased to suppress driving torque and thus effect a traction control through a traction-controlling normally-opened solenoid valve 6 and normally-closed solenoid valve 7 as well as the inlet solenoid valves $4_{LF}$ and $4_{RF}$ and the outlet solenoid valves $5_{LF}$ and $5_{RF}$.

The hydraulic pressure supply source 2 comprises a hydraulic pump P for pumping working oil from a reservoir R, an accumulator A connected to the hydraulic pump P, and a pressure switch S for controlling the operation of the hydraulic pump P.

The hydraulic braking pressure generating means 3 has an input port 3a and an output port 3b leading to the hydraulic pressure supply source 2, and a release port 3c leading to the reservoir R, and is constructed so that hydraulic pressure according to the amount brake pedal 1 is depressed may be delivered from the output port 3b by switch-over of a communication between the output port 3b and the input port 3a and a communication between the output port 3b and the release port 3c in response to the depression of the brake pedal 1.

Each of the brake device $B_{LF}$, $B_{RF}$, $B_{LR}$ and $B_{RR}$ comprises a cylinder 8 and a braking piston 9 slidably received in the cylinder 8, and is constructed to exhibit a braking force by movement of the braking piston 9 according to the hydraulic pressure applied to a hydraulic braking pressure chamber 10 defined between the cylinder 8 and the piston 9.

The solenoid valves $4_{LF}$ and $5_{LF}$ are connected in parallel to hydraulic chamber 10 of drive wheel brake device $B_{LF}$. Solenoid valves $4_{RF}$ and $5_{RF}$ are connected in parallel to hydraulic braking pressure chamber 10 in the drive wheel brake devices $B_{RF}$. Inlet solenoid valve $4_R$ and the outlet solenoid valve $5_R$ are connected in parallel to the driven wheel brake devices $B_{LR}$ and $B_{RR}$. The inlet solenoid valves $4_{LF}$, and $4_{RF}$ and $4_R$ are normally-opened solenoid valves which are closed during excitation of solenoids $4_{LFS}$, $4_{RFS}$ and $4_{RS}$, and the outlet solenoid valves $5_{LF}$, $R_{RF}$ and $5_R$ are normally-closed solenoid valves which are opened during excitation of solenoids $5_{LFS}$, $5_{RFS}$ and $5_{RS}$. Moreover, the inlet solenoid valves $4_{LF}$ and $4_{RF}$ are interposed between the hydraulic braking pressure chambers 10 in the drive wheel brake devices $B_{LF}$ and $B_{RF}$ and an oil passage 11, and the outlet solenoid valves $5_{LF}$ and $5_{RF}$ are interposed between the hydraulic braking pressure chambers 10 in the drive wheel brake devices $B_{FL}$ and $B_{RF}$ and the reservoir R. The inlet solenoid valve $4_R$ is interposed between the hydraulic braking pressure chambers 10 in the driven wheel brake devices $B_{LR}$ and $B_{RR}$ and the output port 3b of the hydraulic braking pressure generating means 3, and the outlet solenoid valve $5_R$ is interposed between the hydraulic braking pressure chambers 10 in the driven wheel brake devices $B_{LR}$ and $B_{RR}$ and the reservoir R.

The traction-controlling normally-opened type solenoid valve 6 is interposed between the oil passage 11 and the output port 3b of the hydraulic braking pressure generating means 3, and the traction-controlling normally-closed type solenoid valve 7 is interposed between the oil passage 11 and the hydraulic pressure supply source 2.

The energization and deenergization of the solenoids $4_{LFS}$, $R_{RFS}$, $4_{RS}$, $5_{LFS}$, $5_{RFS}$, $5_{RS}$, $6_S$ and $7_S$ in the solenoid valves $4_{LF}$, $R_{RF}$, $4_R$, $5_{LF}$, $5_{RF}$, $5_R$, 6 and 7 are controlled by a control means 12, and in a normal condition, the solenoid $4_{LFS}$, $4_{RFS}$, $4_{RS}$, $5_{LFS}$, $5_{RFS}$, $5_{RS}$, $6_S$ and $7_S$ are in their deenergization states. In an anti-lock brake control during braking, the inlet solenoid valve $4_{LF}$, $4_{RF}$, $4_R$ corresponding to a wheel which is about to be locked is brought into a closed state, thereby suppressing the increasing of the braking force to avoid the wheel becoming locked, and if the wheel is still about to be brought into its locked state, the corresponding outlet solenoid valve $5_{LF}$, $5_{RF}$ or $5_R$ means to a communication state to provide a reduction in braking force, thereby eliminating the locking tendency of the wheel.

When the driving wheel is about to begin to slip excessively, the energization and deenergization of the solenoids $6_S$ and $7_S$ of the traction-controlling normally-opened solenoid valve 6 and normally-closed solenoid valve 7 as well as the solenoids $4_{LFS}$ and $4_{RFS}$ in the inlet solenoid valves $4_{LF}$ and $4_{RF}$ and the solenoids $5_{LFS}$ and $5_{RFS}$ in the outlet solenoid valves $5_{LF}$ and $5_{RF}$ are controlled in a switchover manner by the control means 12, thereby controlling the braking force of the left and right front wheel brake devices $B_{LF}$ and $B_{RF}$, i.e., the driving torque in a suppressing manner.

When the solenoids $6_S$ and $7_S$ are energized, with the solenoids $4_{LFS}$, $4_{RFS}$, $5_{LFS}$ and $5_{RFS}$ kept deenergized, to close the normally-opened solenoid valve 6 and to open the normally-closed solenoid valve 7, the hydraulic pressure from the hydraulic pressure supply source 2 is applied to the braking hydraulic pressure chambers 10 in the driving wheel brake devices $B_{LF}$ and $B_{RF}$ to increase the braking force. When the solenoids $4_{LFS}$ and $4_{RFS}$ are energized and the solenoids $5_{LFS}$ and $5_{RFS}$ are deenergized to close the inlet solenoid valves $4_{LF}$ and $4_{RF}$ and the outlet solenoid valves $5_{LF}$ and $5_{RF}$ with the normally-opened solenoid valve 6 closed and the normally closed solenoid valve 7 opened, the hydraulic pressure in the hydraulic braking pressure chamber 10 is maintained to keep the braking force from each of the brake devices $B_{LF}$ and $B_{RF}$. Further, when the solenoids $4_{LFS}$ and $4R_{RFS}$ are energized to close the inlet solenoid valves $4_{LF}$ and $4_{RF}$ and the solenoids $5_{LFS}$, $5_{RFS}$ are energized to open the outlet solenoid valves $5_{LF}$ and $5_{RF}$ with the normally-opened solenoid valve 6 closed and the normally-closed solenoid valve 7 opened, the hydraulic pressure in the hydraulic braking pressure chamber 10 can be released to decrease the braking force from each of the brake devices $B_{LF}$ and $B_{RF}$.

Connected to the control means 12 are wheel speed detectors $13_{FL}$ and $13_{RF}$ for of the left and right driving wheels, i.e., left and right front wheels, wheel speed detectors $13_{LR}$ and $13_{RR}$ for detecting the wheel speeds of the left and right driven wheels, i.e., left and right rear wheels. The control means 12 controls, in a switchover manner, the energization and deenergization of the solenoids $4_{LFS}$ and $4_{RFS}$ of the inlet solenoid valves $4_{LF}$ and $4R_{RF}$ and the solenoids $5_{LFS}$ and $5_{RFS}$ of the outlet solenoid valves $5_{LF}$ and $B_{RF}$ associated with the left and right driving wheel brakes $B_{LF}$ and $B_{RF}$; as well as the solenoid $6_S$ of the traction-controlling normally-opened type solenoid valve 6 and the solenoid 7 of the traction-controlling normally-closed closed type solenoid valve 7 in accordance with values detected by the wheel speed detectors $13_{LF}$, $13_{RF}$, $13_{LR}$ and $13_{RR}$.

The control means 12 comprises a vehicle speed presuming section 16 for presuming the vehicle speed $V_R$ from the values detected by the wheel speed detectors $13_{LR}$ and $13_{RR}$, i.e., the driven wheel speeds, a higher reference speed determination section 17 for determining a higher reference speed $V_{RH}$ on the basis of the vehicle speed $V_R$ obtained in the vehicle speed presuming section 16, a lower reference speed determination section 18 for determining a lower reference speed $V_{RL}$ on the basis of the vehicle speed $V_R$, and a control section 19 for controlling, in a switchover manner, the energization and deenergization of the solenoids $4_{LFS}$, $4_{RFS}$, $5_{LFS}$, $5_{RFS}$, $6_S$ and $7_S$, during fraction control and the energization and deenergization of the solenoids $4_{LFS}$, $r_{RFS}$, $4_{RS}$, $5_{LFS}$, $5_{RFS}$ and $5_{RS}$ during an anti-lock control, on the basis of the decision of the slipping tendency of the driving wheel by comparison of the value detected by the wheel speed detectors $13_{LF}$ and $13_{RF}$, i.e., the driving wheel speeds with the reference speeds $V_{RH}$ and $V_{RL}$.

The higher reference speed determination section 17 determines the higher reference speed $V_{RH}$ from the vehicle speed $V_R$ on the basis of the decision that the driving wheel is in an excessively slipping state, and the lower reference speed determination section 18 determines the lower reference speed $V_{RL}$ from the vehicle speed $V_R$ in accordance with the acceptable slip rate of the driving wheel. The control section 19 controls, in a switchover manner, the energization and deenergization of the solenoids $4_{LFS}$, $4_{RFS}$, $5_{LFS}$, $5_{RFS}$, $6_S$ and $7_S$, so that the driving wheel speed may be between the reference speed $V_{RH}$ and $V_{RL}$.

Figure 2:
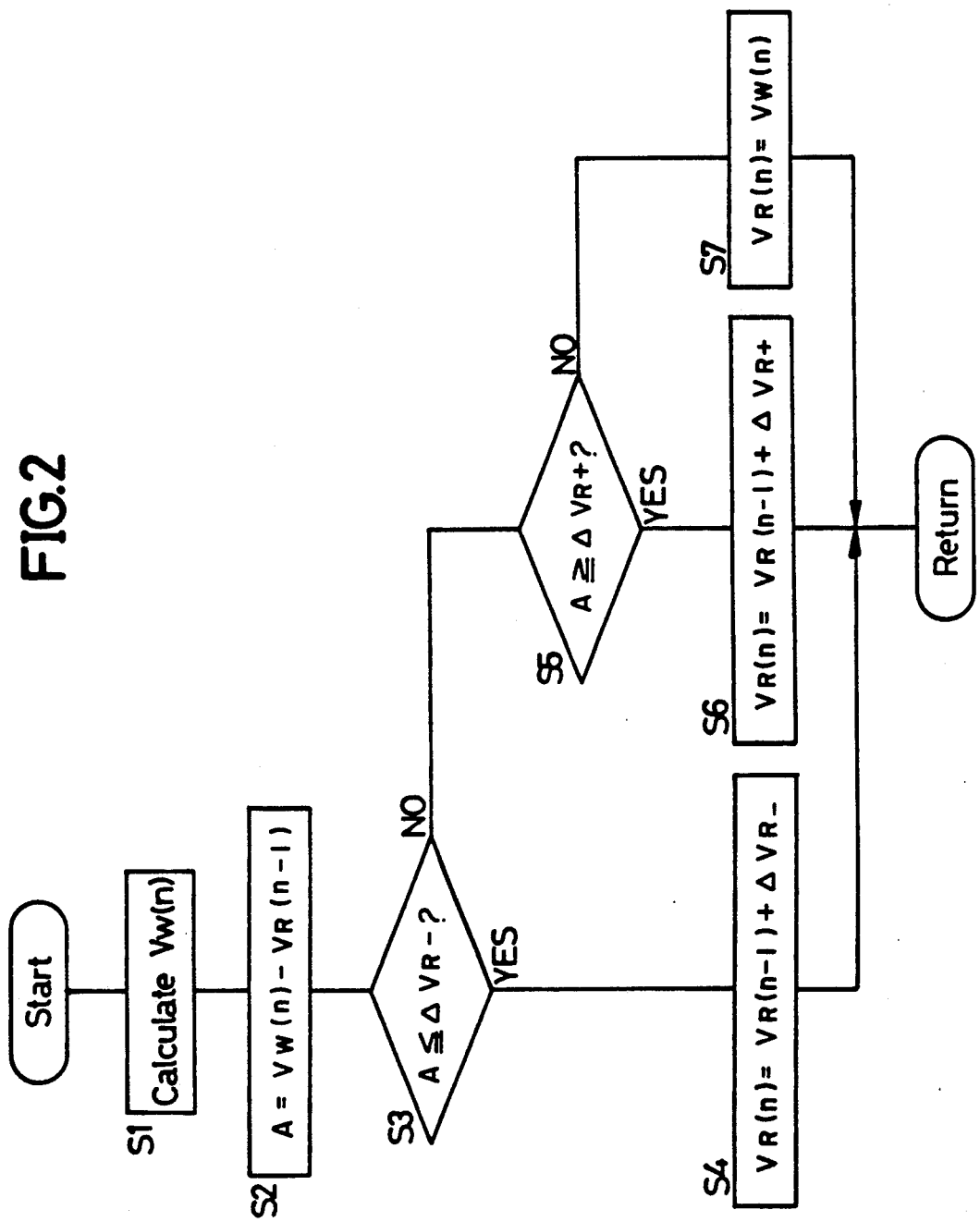
FIG. 2 is a flow chart illustrating a processing procedure for presuming the vehicle speed.

In the vehicle speed presuming section 16, the vehicle speed $V_R$ is presumed according to the process illustrated in FIG. 2. More specifically, a driven wheel speed $V_{W(n)}$ is calculated in a first step S1 by, for example, averaging speeds of both driven wheels. In the next step S2, a calculation $(A = V_{W(n)} - V_{R(n-1)})$ is conducted, wherein $V_{R(n-1)}$ represents a vehicle speed provided on the basis of the driven wheel speed $V_{W(n)}$ in the preceding processing cycle. In the second step S2, the amount A of driven wheel speed changed per unit time, i.e., the acceleration or deceleration of the vehicle is calculated.

In a third step S3, it is decided whether or not $A \leq \Delta V_R$. $\Delta V_{R-}$ is a reference deceleration determined in correspondence to the lowest deceleration on a road surface of the lowest frictional coefficient which can be usually supposed and for example, is set at about $-0.2$ G. If it is decided that $A \leq \Delta V_{R-}$, i.e., if the amount of driven wheel speed changed per unit time indicates a deceleration greater than or equal to the reference deceleration $\Delta V_{R-}$, the process continues to a fourth step S4.

In the fourth step S4, the last determined vehicle speed corrected by the reference deceleration $\Delta V_{R-}$ is determined as the vehicle speed $V_{R(n)}$. That is, in the fourth step S4, the vehicle speed $V_{R(n)}$ is calculated according to the following equation:

$$V_{R(n)} = V_{R(n-1)} + \Delta V_{R-}$$

If it is decided at the third step S3 that $A > \Delta V_{R-}$, the process continues to a fifth step S5 where it is decided whether or not $A \geq \Delta V_{R+}$. $V_{R+}$ is a reference acceleration whose absolute value is set larger than that of the reference deceleration $\Delta V_{R-}$ and, for example, is set at about $+0.5$ to $0.8$G. If it is decided that $A \geq \Delta V_{R+}$, i.e., if the amount A of driven wheel speed changed per unit time indicates an acceleration greater than or equal to the reference acceleration $\Delta V_{R+}$, the process is advanced to a sixth step S6.

At the sixth step S6, the last determined vehicle corrected by the reference acceleration $\Delta V_{R+}$ is determined as the vehicle speed $V_{R(n)}$. That is, in the sixth step S6, the vehicle speed $V_{R(n)}$ is calculated according to the following equation:

$$V_{R(n)} = V_{R(n-1)} + \Delta V_{R+}$$

If it is decided in the fifth step S5 that $A < \Delta V_{R+}$, i.e., $\Delta V_{R-} < A < \Delta V_{R+}$, the process branches to a seventh step S7 where the driven wheel speed $V_{W(n)}$ is determined as the vehicle speed $V_{R(n)}$.

Figure 3:
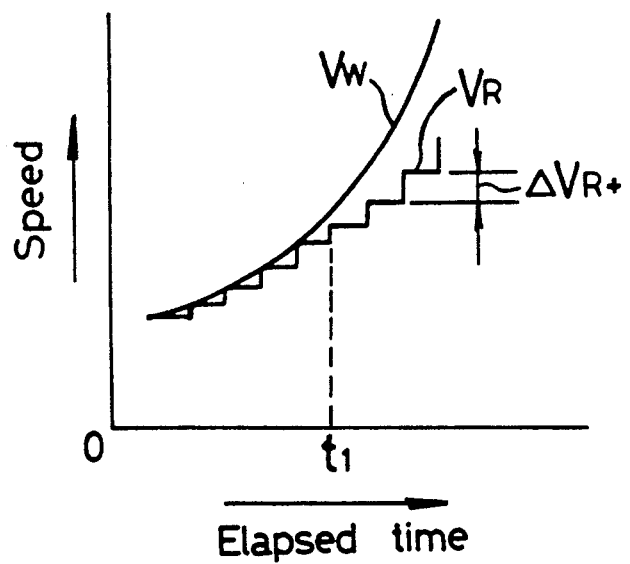
FIG. 3 is a graph illustrating a relationship between the driven wheel speed and the vehicle speed during an increase of speed.

With the processing in the vehicle speed presuming section 16, when the amount of driven wheel speed $V_W$ changed per unit time is less than the reference acceleration $\Delta V_{R+}$ during an increase in speed, as shown in FIG. 3, the vehicle speed $V_R$ is changed to follow the change of the driven wheel speed $V_W$, but when the amount of driven wheel speed $V_W$ changed per unit time becomes greater than or equal to the reference acceleration $\Delta V_{R+}$ at a time $t_1$, the vehicle speed $V_R$ will be changed after the time $t_1$ at a rate of increase corresponding to the reference acceleration $\Delta V_{R+}$.

Figure 4:
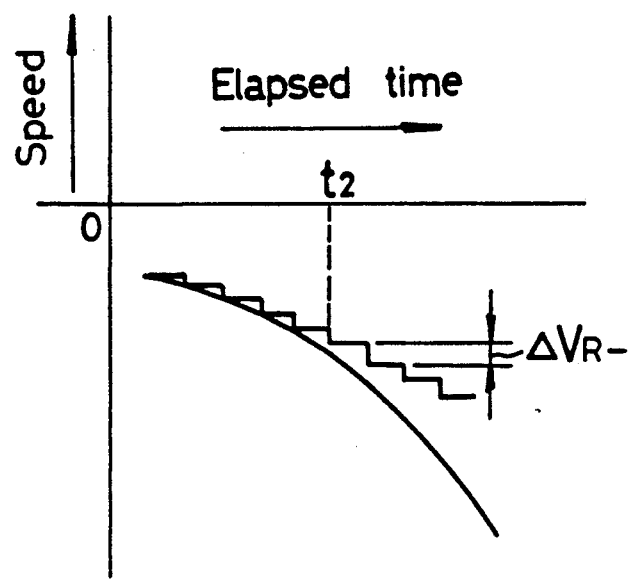
FIG. 4 is a graph illustrating a relationship between the driven wheel speed and the vehicle speed during a reduction of speed.

During a decrease in speed, when the amount of driven wheel speed $V_W$ changed per unit time is less than the reference deceleration $\Delta V_{R-}$, as shown in FIG. 4, the vehicle speed $V_R$ is changed to follow the change in the driven wheel speed $V_W$, but when the amount of driven wheel speed changed per unit time becomes greater than or equal to the reference deceleration $\Delta V_{R-}$ at a time $t_2$, the vehicle speed $V_R$ will be changed after the time $t_2$ at a rate of decrease corresponding to the reference deceleration $\Delta V_R$.

The operation of this embodiment will be described below with reference to FIG. 5. When the vehicle is travelling on a bad road at a time $t_3$, the driven wheel speed $V_W$ varies substantially from the time $t_3$. However, the vehicle speed $V_R$ is equal to the driven wheel speed if the amount of driven wheel speed changed per unit time indicates a deceleration smaller than the reference deceleration $\Delta V_{R-}$; is equal to the last determined vehicle speed $V_{R(n-1)}$ corrected by the reference deceleration $\Delta V_{R-}$ if the amount of driven wheel speed changed per unit time indicates a deceleration greater than or equal to the reference deceleration $\Delta V_{R-}$; is equal to the driven wheel speed if the amount of driven wheel speed changed per unit time indicates an acceleration less than the reference acceleration $\Delta V_{R+}$; and is equal to the last determined vehicle speed corrected by the reference acceleration $\Delta V_{R+}$ if the amount of driven wheel speed changed per unit time indicates an acceleration greater than or equal to the reference acceleration $\Delta V_{R+}$. Therefore, the vehicle speed $V_R$ is gradually increased after the time $t_3$.

As a result, the higher reference speed $V_{RH}$ and the lower reference speed $V_{RL}$ determined on the basis of the vehicle speed $V_R$ are also gradually increased, and in the traction control in which the slipping tendency of the driving wheels is decided by comparison of the driving wheel speed with the reference speeds $V_{RH}$ and $V_{RL}$, the control sensitivity is reduced. Therefore, it is possible to avoid accidentally deciding that the driving wheel has entered the slipping state with a substantial change in wheel speed during travelling of the vehicle on the bad road, thereby preventing an unnecessary traction control from being executed.

In an alternate embodiment, the driven wheel speed may be determined as the vehicle speed $V_R$ when the amount of driven wheel speed changed per unit time indicates a deceleration smaller than the reference deceleration $\Delta V_{R-}$, and the last determined vehicle speed corrected by the reference deceleration $\Delta V_{R-}$ may be determined as the vehicle speed $V_R$ when the amount of driven wheel speed changed per unit time indicates a deceleration greater than or equal to the reference deceleration $\Delta V_{R-}$. Even if doing so, the vehicle speed $V_R$ can be increased to reduce the control sensitivity when the wheel speed varies substantially, thereby avoiding the accidental execution of the traction control.

Although a braking force is applied to the driving wheel in suppressing the driving torque in the above-described embodiment, it will be understood that an engine output providing the driving force to the driving wheel may be reduced.

We claim:

1. A traction control method for a vehicle, comprising the steps of:
    comparing the amount of driven wheel speed ($V_W$) changed per unit time with a reference deceleration ($\Delta V_{R-}$) determined in correspondence to the lowest deceleration on a road surface of a lowest frictional coefficient which can be usually supposed;
    setting the vehicle speed ($V_R$) equal to the driven wheel speed ($V_W$), if the amount of said driven wheel speed ($V_W$) changed per unit time indicates a deceleration less than the reference deceleration ($\Delta V_{R-}$);
    setting the vehicle speed ($V_R$) equal to the last determined vehicle speed ($V_{R(n-1)}$) corrected by a value based on the reference deceleration ($\Delta V_{R-}$), if the amount of said driven wheel speed ($V_W$) changed per unit time indicates a deceleration greater than or equal to the reference deceleration ($\Delta V_{R-}$);
    determining a slipping tendency of a driving wheel in a driving state by comparing a reference speed ($V_{RH}$, $V_{RL}$) obtained on the basis of said vehicle speed ($V_R$) with a driving wheel speed; and
    suppressing the driving torque in accordance with said determined slipping tendency of the driving wheel in the driving state.

2. A traction control method for a vehicle, comprising the steps of:
    comparing the amount of driven wheel speed ($V_W$) changed per unit time with a reference deceleration ($V_{R-}$) as well as a reference acceleration ($\Delta V_{R+}$) whose absolute value is set larger than that of said reference deceleration ($\Delta V_{R-}$);
    setting the vehicle speed ($V_R$) equal to the driven wheel speed ($V_W$), if the amount of said driven wheel speed ($V_W$) changed per unit time indicates a deceleration less than the reference deceleration ($\Delta V_{R-}$);
    setting the vehicle speed ($V_R$) equal to the last determined vehicle speed ($V_{R(n-1)}$) corrected by a value based on the reference deceleration ($\Delta V_{R-}$), if the amount of said driven wheel speed ($V_W$) changed per unit time indicates a deceleration greater than or equal to the reference deceleration ($\Delta V_{R-}$);
    setting the vehicle speed ($V_R$) equal to the driven wheel speed ($V_W$), if the amount of said driven wheel speed ($V_W$) changed per unit time indicates an acceleration less than the reference acceleration ($\Delta V_{R+}$);
    setting the vehicle speed ($V_R$) equal to the last determined vehicle speed ($V_{R(n-1)}$) corrected by said reference acceleration ($\Delta V_{R+}$), if the amount of said driven wheel speed ($V_W$) changed per unit time indicates an acceleration greater than or equal to the reference acceleration ($\Delta V_{R+}$);
    determining a slipping tendency of a driving wheel in a driving state by comparing a reference speed ($V_{RH}$, $V_{RL}$) obtained on the basis of said vehicle speed ($V_R$) with a driving wheel speed; and
    suppressing the driving torque in accordance with said determined slipping tendency of said driving wheel in the driving state.

* * * * *